2,962,398
METAL MARKING INK

Griffin L. Jones, 2166 Waverly Ave., San Antonio 1, Tex.

No Drawing. Filed June 26, 1959, Ser. No. 823,267

6 Claims. (Cl. 148—6.14)

(Granted under Title 35, U.S. Code (1952), sec. 266)

The invention described herein may be manufactured and used by or for the United States Government for governmental purposes without payment to me of any royalty thereon.

This invention relates to improvements in marking ink. More particularly it is concerned with an improved ink for use in the etching of metals and their alloys.

In the production and handling of devices made up of metal parts, it is most often found desirable to apply a mark to each part as an indication of such items as identity, inspection date or quality. This marking is conventionally done with an etching ink that is usually applied by means of a suitable stamp having a desired design thereon. Said ink forms a reaction product which is bonded to the metal or alloy thereof and provides a mark usually having distinctive coloration. The inks which are presently in use for this purpose have been found to be lacking in certain desirable features. Among these missing features are the absence of permanency of bond to the metal or alloy and the failure to provide proper color contrast. Such inks may take the form of ordinary stamping inks, organic dyes, or pigmented paints. Each of these is soluble in various solvents and/or processing solutions.

It is a primary object of this invention to provide an improved metal marking ink which will form a reaction product on the metal or alloy to be marked.

Another object of the invention is to provide such a fluid which will produce a mark having a contrasting color in relation to the metal being etched.

Still another object of the invention is to provide a metal marking ink which will form a permanent bond and will neither wear off nor dissolve during the processing of the marked item or part.

An ink having the desirable characteristics heretofore set forth has been found to consist of a solution of zirconium oxychloride, a copper chloride, hydrochloric acid and water. The term copper chloride, as employed herein, is generic to both cupric and cuprous chloride.

In the preparation of my novel marking ink only two steps are necessary. The first of these comprises the mixture of the zirconium oxychloride and the copper chloride in the water. The second step consists of adding hydrochloric acid to this mixture and stirring until completely dissolved. In applying the ink, a medium grit aluminum oxide disc may be used as an ink pad. This disc should be placed in a glass or plastic container and then saturated with the ink. Any excess should be removed from the bottom of the container prior to use. If desired, a suitable cloth or blotting paper may be used in place of the abrasive disc. Once the pad has been properly prepared, the selected stamp is then inked with a minimum of ink. The stamp is lightly applied to the part which is being marked. After such application (in most cases only a few seconds should be permitted to elapse) the mark is neutralized by the application of ammonia water or other similar neutralizer such as a soluble cutting oil, a light oil, a lime water wash or dusting with a weak alkali.

The actual quantitative composition of the marking ink of this invention is as follows:

| | |
|---|---|
| Zirconium oxychloride _____ grams__ | 20 |
| Copper chloride _____ do____ | 100 |
| Hydrochloric acid _____ milliliters__ | 300 |
| Water _____ do____ | 700 |

In preparing this solution the same beneficial results will be obtained with the use of either cupric or cuprous chloride. The amounts of each of the solid materials employed may vary within ±1 gram while the amounts of each of the liquid components may vary ±10 milliliters.

The marking ink of this invention has been found to be extremely versatile. It has been successfully employed in the marking of such metals as zinc, cadmium, copper, iron, steel, magnesium, aluminum and the alloys of each. When applied to aluminum a permanent black mark results. On iron alloys the ink leaves an orange-red mark. The proportions of the several components, as elaborated above are suitable for use with any of the enumerated metals.

However, it has been found preferable, in the case of marking magnesium or its alloys, to dilute the marking ink by adding two volumes of water for each volume of ink employed.

It is to be understood that the above described quantitative formula is cited only as an example, and that the quantities of the several components may be varied to the extent indicated. Obviously other quantitative examples could be given for the preparation of lesser or greater quantities of ink so long as the ratio of components is maintained as illustrated.

What is claimed is:

1. A metal marking ink solution consisting essentially of about 19 to 21 grams of zirconium oxychloride, about 99 to 101 grams of copper chloride, about 290 to 310 milliliters of hydrochloric acid and about 690 to 710 milliliters of water.

2. A metal marking ink solution defined in claim 1 wherein the copper chloride is cuprous chloride.

3. A metal marking ink solution as defined in claim 1 wherein the copper chloride is cupric chloride.

4. A metal marking ink solution consisting essentially of about 20 grams of zirconium oxychloride, 100 grams of a copper chloride, 300 milliliters of hydrochloric acid and 700 milliliters of water.

5. A metal marking ink solution as defined in claim 4 wherein the copper chloride is cuprous chloride.

6. A metal marking ink solution as defined in claim 4 wherein the copper chloride is cupric chloride.

References Cited in the file of this patent

UNITED STATES PATENTS

| | | |
|---|---|---|
| 2,441,300 | Bunte _____ | May 11, 1948 |
| 2,647,864 | Goffredo _____ | Aug. 4, 1953 |